(12) United States Patent
Shober et al.

(10) Patent No.: US 9,277,572 B1
(45) Date of Patent: Mar. 1, 2016

(54) MODIFICATION OF DIAMETER MESSAGES TO ESTABLISH A COMMUNICATION SESSION OVER A HOME PACKET DATA NETWORK GATEWAY

(71) Applicant: Sprint Communications Company L.P., Overland Park, KS (US)

(72) Inventors: Robert Anthony Shober, Overland Park, KS (US); Randall Allen Smischny, Overland Park, KS (US); Anthony Charles Wells, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 195 days.

(21) Appl. No.: 13/891,449

(22) Filed: May 10, 2013

(51) Int. Cl.
*H04L 12/28* (2006.01)
*H04W 76/02* (2009.01)

(52) U.S. Cl.
CPC ..................................... *H04W 76/02* (2013.01)

(58) Field of Classification Search
USPC ................. 370/235–254, 310–328, 354–392; 709/204–217, 223–238
See application file for complete search history.

(56) References Cited

U.S. PATENT DOCUMENTS

| | | | | |
|---|---|---|---|---|
| 8,725,820 B2 * | 5/2014 | McNamee et al. | | 709/206 |
| 8,725,896 B2 * | 5/2014 | McNamee et al. | | 709/238 |
| 8,797,902 B2 * | 8/2014 | Jorgensen et al. | | 370/252 |
| 8,824,370 B2 * | 9/2014 | McNamee et al. | | 370/328 |
| 8,850,064 B2 * | 9/2014 | Mann et al. | | 709/238 |
| 8,880,726 B2 * | 11/2014 | McNamee et al. | | 709/238 |
| 8,929,238 B2 * | 1/2015 | Jorgensen et al. | | 370/252 |
| 2013/0326085 A1 * | 12/2013 | Mann et al. | | 709/238 |
| 2014/0067941 A1 * | 3/2014 | Mann et al. | | 709/204 |
| 2014/0068100 A1 * | 3/2014 | Mann et al. | | 709/238 |
| 2014/0068101 A1 * | 3/2014 | Mann et al. | | 709/238 |
| 2014/0171089 A1 * | 6/2014 | Janakiraman et al. | | 455/445 |

* cited by examiner

*Primary Examiner* — Man Phan

(57) ABSTRACT

Embodiments disclosed herein provide systems and methods for modifying diameter messages to establish a communication session over a home packet data network gateway (PGW). In a particular embodiment, a method provides receiving, from a wireless communication device, a request to establish a communication session over a communication network, wherein the communication network exchanges messages using a Diameter authentication, authorization, and accounting protocol. in response to receiving the request, the method provides determining a home PGW for the wireless communication device and adding an indication of the home PGW to a Diameter message for establishing the communication session. Based on the indication of the home PGW, the method provides routing the Diameter message to establish the communication session between the wireless communication device and the home PGW.

18 Claims, 7 Drawing Sheets

US 9,277,572 B1

MODIFICATION OF DIAMETER MESSAGES TO ESTABLISH A COMMUNICATION SESSION OVER A HOME PACKET DATA NETWORK GATEWAY

TECHNICAL BACKGROUND

Many modern wireless communication networks, such as Long Term Evolution (LTE) networks, use the Diameter authentication, authorization, and accounting protocol. The Diameter protocol defines messages that transferred among network elements to establish and service communication sessions for wireless devices. In particular, a communication session is established and serviced through a packet data network gateway (PGW). The PGW provides an interface for packet data communications of the communication session to be exchanged between the wireless network and other packet data networks, such as the Internet. In addition to acting as a packet data interface for the wireless network, the PGW may also manage the communication session based on rules associated with the communication session, such as quality of service, billing, or any other type of parameter relevant to the servicing of a communication session.

Larger wireless networks may include multiple PGWs to handle communication sessions with wireless devices. For example, each PGW in a wireless network may handle communication sessions for wireless devices in a different geographic area. In some cases, a wireless device may be associated with a home PGW, which may be based upon a home area where the wireless device is usually located. Unfortunately, if the wireless device is not located within that home area, then a communication session for the wireless device may be routed through a different PGW that is not capable of administering rules for the communication session as would the home PGW.

OVERVIEW

Embodiments disclosed herein provide systems and methods for modifying diameter messages to establish a communication session over a home packet data network gateway (PGW). In a particular embodiment, a method provides receiving, from a wireless communication device, a request to establish a communication session over a communication network, wherein the communication network exchanges messages using a Diameter authentication, authorization, and accounting protocol. In response to receiving the request, the method provides determining a home PGW for the wireless communication device and adding an indication of the home PGW to a Diameter message for establishing the communication session. Based on the indication of the home PGW, the method provides routing the Diameter message to establish the communication session between the wireless communication device and the home PGW.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
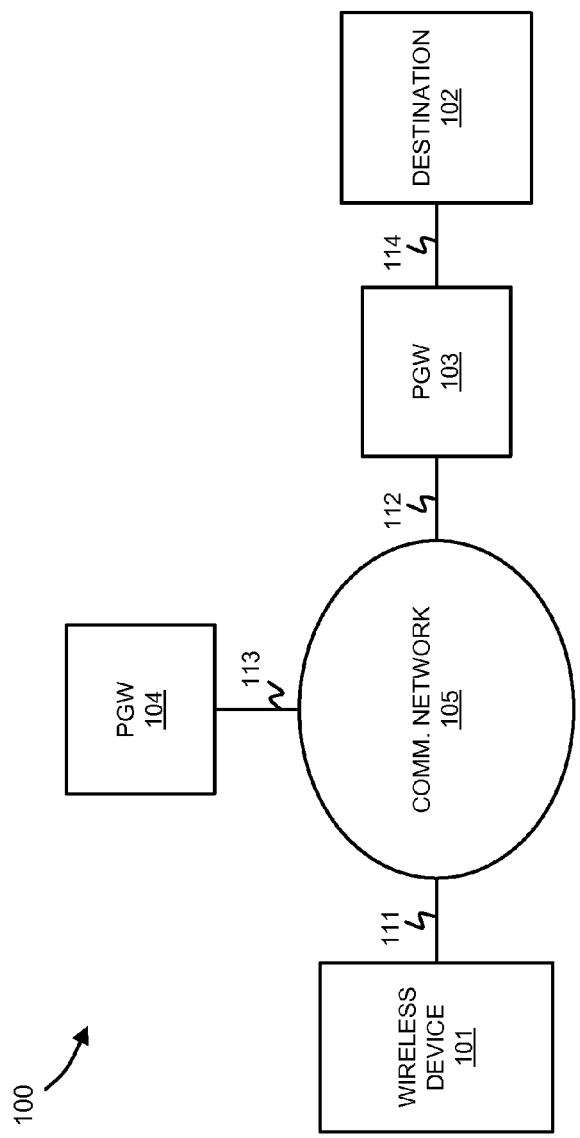
FIG. 1 illustrates a wireless communication system for modifying diameter messages to establish a communication session over a home PGW.

FIG. 1 illustrates wireless communication system 100. Wireless communication system 100 includes wireless communication device 101, destination 102, packet data network gateway (PGW) 103, PGW 104, and communication network 105. Wireless communication device 101 and communication network 105 communicate over wireless link 111. PGW 103 and communication network 105 communicate over communication link 112. PGW 104 and communication network 105 communicate over communication link 113. PGW 103 and destination 102 communicate over communication link 114.

In operation, communication network 105 provides wireless device 101 with access to packet data communication services. The packet data communication services may include any information that can be transmitted using packet data, such as voice communications, video communications, application data, website data, and the like. The access may be provided using one or more wireless protocols. However, control communications between elements of communication network 105, including PGWs 103 and 104, are exchanged using a Diameter authentication, authorization, and accounting protocol. Messages transferred between network elements using the Diameter protocol allow communication network 105 to establish and administer packet communication sessions for wireless device 101.

In order to exchange packet communications with other devices and systems, such as devices or systems located on the Internet, the communications exchanged with wireless device 101 pass through a PGW, such as PGW 103 or 104. The PGW supplies wireless device 101 with a network address, such as an IP address, to which other systems and device can direct communications intended for wireless device 101. Additionally, the PGW may administer rules and monitor communications exchanged with wireless device 101 through the PGW. The rules may include a static IP address for wireless device 101, quality of service requirements for communications of wireless device 101, billing parameters for communications of wireless device 101, service restrictions on communications of wireless device 101, or any other type of rule that may be applied to communications of a wireless communication device.

Many, if not all, of the rules for the communications of wireless device 101 may only be available through a particular PGW, which this disclosure refers to as a home PGW. Therefore, if the communications of wireless device 101 are not routed through the home PGW of wireless device 101, then the rules will not be applied to the communications and the services allowed by those rules will not be available to wireless device 101. For example, service rules for wireless device 101 may indicate that wireless device 101 is to be assigned a static IP address for communications. If wireless device 101 is located in an area served by communication network 105 where a PGW other than the home PGW is used for packet communications, then wireless device 101 will not receive that static IP address and any communications needing that static IP address cannot be exchanged.

Figure 2:
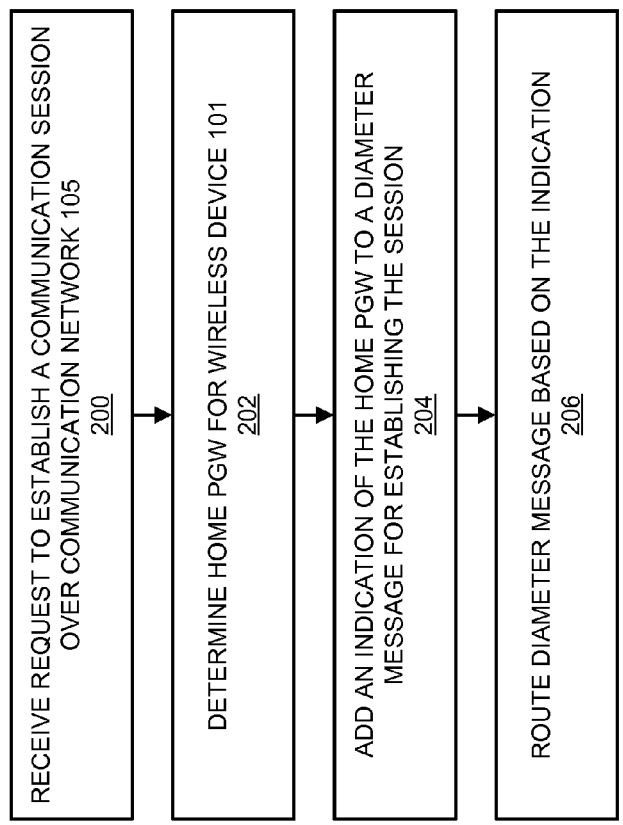
FIG. 2 illustrates an operation of the wireless communication system for modifying diameter messages to establish a communication session over a home PGW.

FIG. 2 illustrates an operation of wireless communication system 100 for modifying diameter messages to establish a communication session over a home PGW. Communication network 105 receives a request to establish a communication session from wireless device 101 (step 200). Communication network 105 exchanges messages using a Diameter authentication, authorization, and accounting protocol but the initial request received from wireless device 101 may be received in some other format. For example, the communication session request may be received by network 105 using a request message defined for a wireless protocol used by the wireless device to access network 105. In this example, the communication session is requested between wireless device 101 and destination 102. The request may have originated at wireless device 101 or at destination 102. Destination 102 may be a system or device, such as another wireless device, a wired device, a personal computer, a web server, an application server, or any other type of communication system. Furthermore, while communication link 114 is shown as a direct link, communication link 102 may comprise other communication networks, such as the Internet.

In response to receiving the request, communication network 105 determines a home PGW for wireless device 101 (step 202). In this example, communication network 105 may choose between PGW 103 and 104, however, other examples may include additional PGWs. Communication network 105 may use any method for determining an association between two devices or systems. In some embodiments, communication network 105 may reference a data structure that indicates which home PGWs correspond to which wireless devices. That data structure may be stored on a system within communication network 105, such as an authentication, authorization, and accounting server or the like. The data structure may also include other information used to authorize wireless devices to access communication network 105.

In this embodiment, communication network 105 determines that PGW 103 is the home PGW for wireless device 301. Accordingly, communication network 105 adds an indication of home PGW 103 to a Diameter message for establishing the communication session (step 204). The indication of home PGW 103 may be added to a new field of the Diameter message (e.g. a new attribute value pair (AVP) of the message), within an existing field of the Diameter message (e.g. an existing AVP of the message), or by any other means allowed by the Diameter protocol—including combinations thereof.

Based on the indication of home PGW 103, communication network 105 routes the Diameter message to establish the communication session between wireless device 101 and home PGW 103 (step 206). Network elements that use the Diameter protocol within communication network 105 use the indication of home PGW 103 in the Diameter message to determine where to route the message such that the communication session is established using home PGW 103. The message may be routed to PGW 103 to establish the communication session or may be routed to another system to facilitate the establishment of the communication system with PGW 103. In some embodiments, the indication of home PGW 103 is placed in a field of the Diameter message that indicates a destination for the message. Thus, network elements of communication network 105 route the message to the destination indicated in the destination field of the message.

Upon establishing the communication session with PGW 103, communications between wireless device 101 and destination 102 may proceed through PGW 103. Moreover, since PGW 103 is the home PGW for wireless device 101, any rules for providing communications services to wireless device 101 can be implemented for the communication session, such as assigning a static IP address and/or ensuring quality of service requirements. If wireless device 101 is communicating in a location of communication network 105 that defaulted to establishing communication sessions with PGW 104, then, without the process described above, the communication session would have been established with PGW 104 and the home PGW communication services would not be provided. Likewise, if PGW 104 was determined to be the home PGW for wireless device 101, then steps 204 and 206 may be skipped since the communication session would default to PGW 104 anyway.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

PGWs 103-104 each comprise a computer system and communication interface for serving packet communications to wireless device 101. PGWs 103-104 may also include other components such as a server, data storage system, and power supply. PGWs 103-104 may reside in a single device or may be distributed across multiple devices. PGWs 103-104 are shown externally to communication network 105, but PGWs 103-104 could be considered elements of communication network 105.

Communication network 105 comprises network elements that provide communications services to wireless device 101 through wireless access nodes. Communication network 105 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-114 use metal, glass, air, space, or some other material as the transport media. Communication links 112-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-114 could be direct links or may include intermediate networks, systems, or devices.

Figure 3:
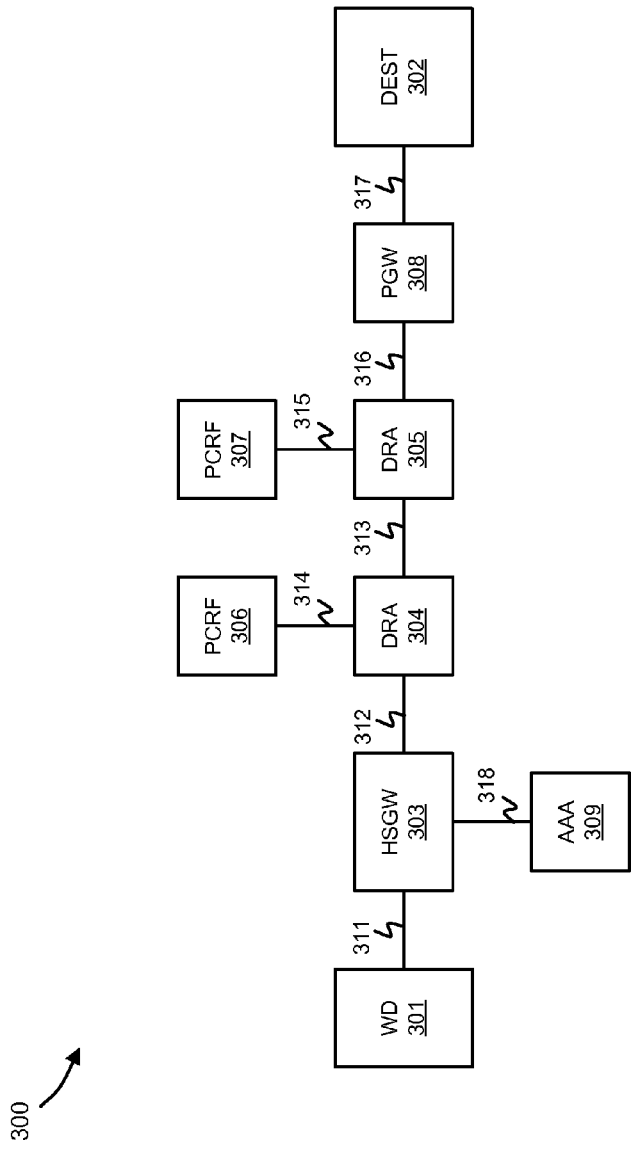
FIG. 3 illustrates a wireless communication system for modifying diameter messages to establish a communication session over a home PGW.

FIG. 3 illustrates wireless communication system 300. Wireless communication system 300 includes wireless communication device 301, destination 302, High Rate Packet Data Serving Gateway (HSGW) 303, Diameter Routing Agent (DRA) 304, DRA 305, Policy Charging and Rules Function (PCRF) 306, PCRF 307, PGW 308, and Authentication, Authorization, and Accounting (AAA) server 309. Elements 303-309 may be included in a communication network like communication network 105 of FIG. 1. Wireless device 301 communicates with HSGW 303 over communication link 311. Though not shown, communication link 311 may include a wireless access node, such as a wireless base station, and/or other intervening systems between HSGW 303 and wireless device 301. Elements 301-309 of FIG. 3 communicate over communication links 312-318.

Figure 4:
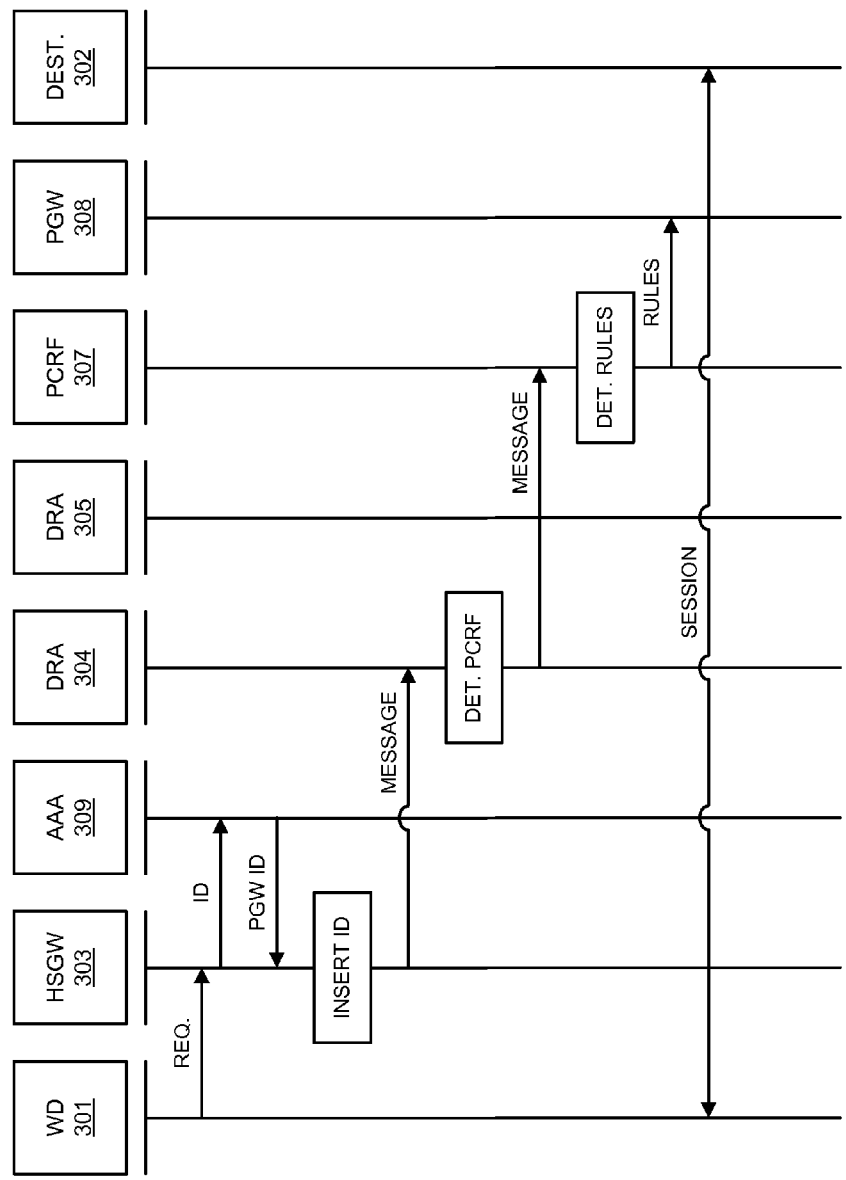
FIG. 4 illustrates an operation of the wireless communication system for modifying diameter messages to establish a communication session over a home PGW.

FIG. 4 is a sequence diagram illustrating the operation of wireless communication system 300 for modifying diameter messages to establish a communication session over a home PGW. In this embodiment, wireless device 301 is accessing data services via a third generation (3G) wireless data protocol, such as EVDO, while the elements 304-308 are part of a fourth generation (4G) wireless data protocol network, such as LTE. HSGW 303 is a gateway for packet data services between the 3G network and the 4G network. Thus, packet data communications that are exchanged between destination 102 and wireless device 301 when wireless device 301 is accessing the 3G network are transferred through HSGW 303.

To establish a communication session with destination 302, wireless device 301 transfers a request for the communication session to HSGW 303. HSGW 303 then transfers an identifier of wireless device 301 to AAA 309. The identifier may be an Electronic Serial Number (ESN) for wireless device 301, an identifier for a subscriber, such as a user or entity, associated with wireless device 301, or any other way of uniquely identifying wireless device 301. Upon receiving the identifier, AAA 309 determines that PGW 308 is the home PGW associated with wireless device 301 and transfers the identity of PGW 308 to HSGW 303. The identity of PGW 308 may be a network address for PGW 308 or may be some other means of identifying a network element. The identity of PGW 308 may be transferred along with other information pertaining to whether wireless device 301 is allowed to access the communication network or may be transferred separately.

In some embodiments, AAA 309 determines that PGW 308 is the home PGW for wireless device 301 by accessing a back end subscription database that includes information about how communication services are provided to wireless devices. A Home Subscriber Server (HSS) is an exemplary system that maintains such a back end subscription database, although other systems exist with similar functionality. When accessed by AAA 309, the HSS provides an indicator of that PGW 308 is the home PGW to be used for the requested communication session. The HSS may explicitly identify PGW 308 as the home PGW to AAA 309 or the HSS may provide some other implicit identifier for PGW 308, such as an identifier for a system associated with PGW 308 (e.g. PCRF 307).

Upon receiving the identity of PGW 308, the identity is inserted into a Diameter protocol message that will be used to set up the communication session. The Diameter message may also include information about the communication session, such as identifying the type of communication session, the end points of the communication session (i.e. wireless device 301 and destination 302), or any other information relevant to the establishment of a communication session. The diameter message is then transferred to DRA 304 for routing to the appropriate network element for establishing the communication session.

In this example, the Diameter message will be routed to a PCRF associated with PGW 308. Accordingly, DRA 304 references the identity of PGW 308 as included in the Diameter message and then determines that PCRF 307 is associated with PGW 308. DRA 304 may maintain a data structure that identifies PGWs and respective PCRFs or may use some other method for determining associated network elements. PCRF 307 may be associated with PGW 308 because PCRF 307 may be produced by the same network equipment manufacturer as PGW 308, PCRF 307 may be assigned to PGW 308 based on physical proximity to PGW 308, based on an arbitrary association, or for any other reason that one network element may be associated with another.

After determining that PCRF 307 is associated with PGW 308, DRA 304 inserts an identifier, such as a network address, into a field of the Diameter message that indicates a destination for the Diameter message. DRA 304 transfers the Diameter message and, upon receiving the Diameter message, DRA 305 and any other Diameter elements between DRA 304 and PCRF 307, routes the message to PCRF 307 based on the destination identified in the Diameter message. If not for DRA 304 changing the destination of the Diameter message to PCRF 307, DRA 304 would have routed the Diameter message to PCRF 306 since PCRF 306 is associated with a PGW that is the default PGW for the location of wireless device 301. The default PGW and PCRF 306 would not have been able to implement rules for the communication session as PCRF 307 is able to do.

Upon receiving the Diameter message, PCRF 307 determines any rules that should apply to the communication session with wireless device 301. The rules may include quality of service rules, billing rules, a static IP address for wireless device 301, or any other information that pertains to how the communication session is provided to wireless device 301. The rules are then transferred to PGW 308 and PGW 308 establishes and services the communication session between wireless device 301 and destination 302 based on the rules from PCRF 307. In some embodiments, the rules are transferred using a Gx interface defined by the Diameter protocol. The Gx interface may pass through DRA 305 as shown in FIG. 3 or may take a different path to PGW 308.

Figure 5:
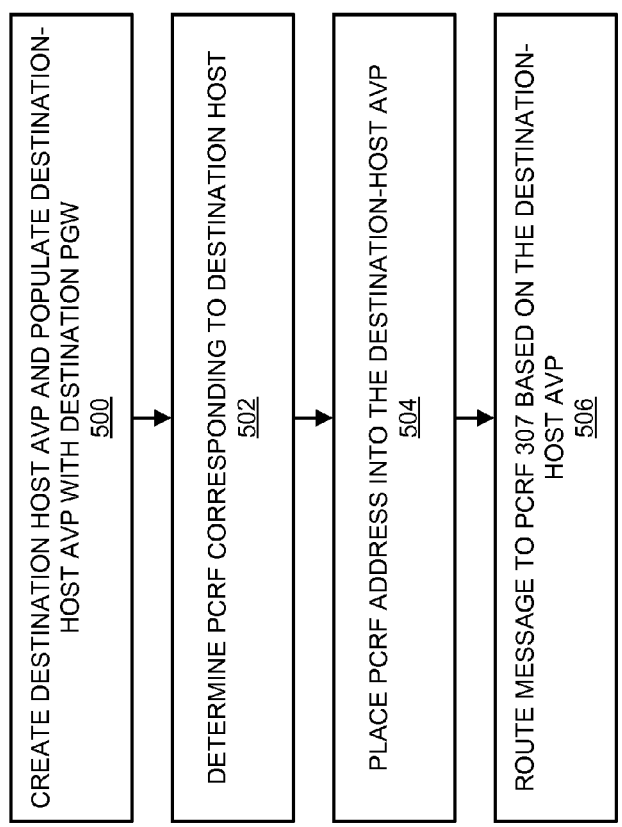
FIG. 5 illustrates an operation of a diameter routing agent for modifying diameter messages to establish a communication session over a home PGW.

FIG. 5 illustrates an operation of DRA 304 for modifying diameter messages to establish a communication session over a home PGW. In this embodiment, DRA 304 receives the Diameter message discussed above from HSGW 303. After receiving the identity of PGW 308 from AAA 309, HSGW 303 created a "Destination-PGW" AVP for the Diameter message and populated the "Destination-PGW" AVP with an address for PGW 308. Upon receiving the Diameter message from HSGW 303, DRA 304 creates a "Destination-Host" AVP and populates the "Destination-Host" AVP with the address for PGW 308 (step 500).

DRA 304 then determines that PCRF 307 is associated with PGW 308 based on the address for PGW 308 in the "Destination-Host" AVP (step 502) and replaces the address of PGW 308 in the "Destination-Host" AVP with the network address of PCRF 307 (step 504). In some embodiments, AAA 309 may provide HSGW 308 with the address of PCRF 307 rather than PGW 308. Thus, in those embodiments, DRA 304 may skip steps 502 and 504 since the "Destination-Host" AVP will already contain the address of PCRF 507. Once the "Destination-Host" AVP is populated with the address of PCRF 307, DRA 304 transfers the Diameter message, which will be routed to PCRF 307 based on the address in the "Destination-Host" AVP (step 506).

Figure 6:
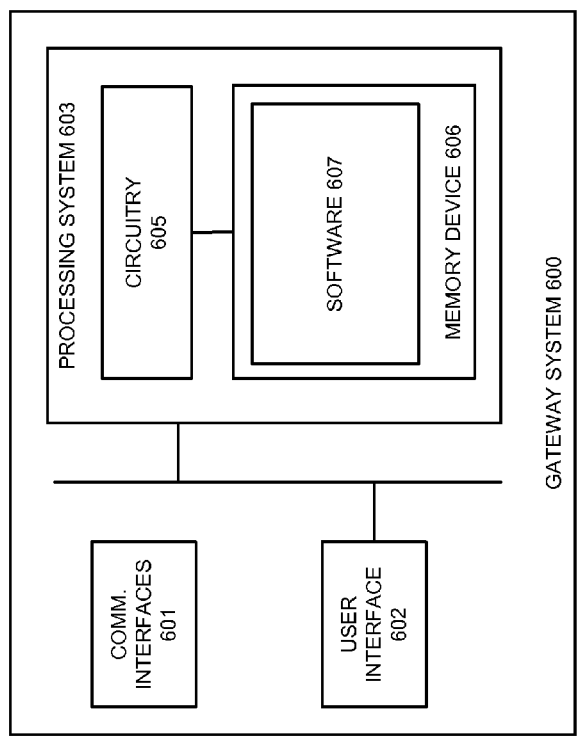
FIG. 6 illustrates a gateway system for modifying diameter messages to establish a communication session over a home PGW.

FIG. 6 illustrates gateway system 600. Gateway system 600 is an example of a network element within communication network 105 or HSGW 303, although the network element or HSGW 303 may use alternative configurations. Gateway system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate gateway system 600 as described herein.

In particular, operating software 607 directs processing system 603 to receive, from a wireless communication device via communication interface 601, a request to establish a communication session over a communication network, wherein the communication network exchanges messages using a Diameter authentication, authorization, and accounting protocol. In response to receiving the request, operating software 607 directs processing system 603 to determine a home packet data network gateway (PGW) for the wireless communication device and add an indication of the home PGW to a Diameter message for establishing the communication session. Based on the indication of the home PGW, operating software 607 directs processing system 603 to route the Diameter message to establish the communication session between the wireless communication device and the home PGW.

Figure 7:
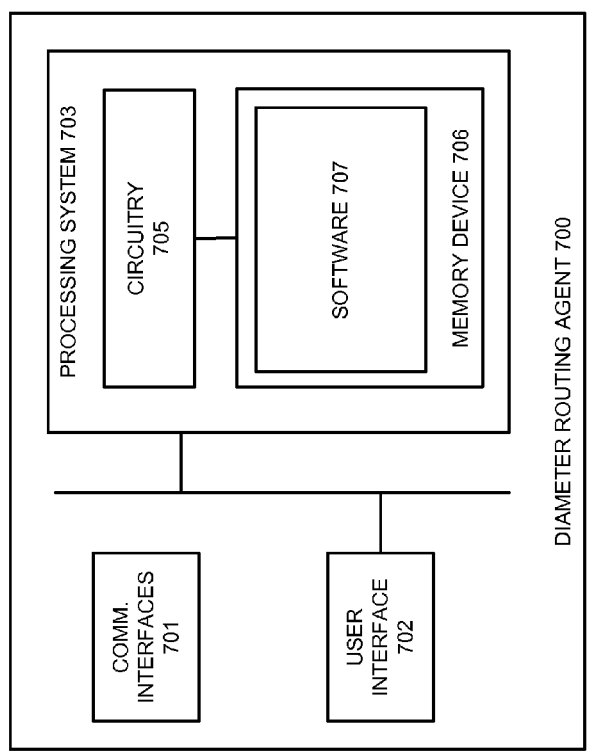
FIG. 7 illustrates a diameter routing agent for modifying diameter messages to establish a communication session over a home PGW.

FIG. 7 illustrates diameter routing agent 700. Diameter routing agent 700 is an example of a network element within communication network 105, DRA 304, or DRA 305, although the network element or DRAs 304-305 may use alternative configurations. Diameter routing agent 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 may include an operating system, utilities, drivers, network interfaces, applications, or some other type of software. When executed by circuitry 705, operating software 707 directs processing system 703 to operate diameter routing agent 700 as described herein.

In particular, operating software 707 directs processing system 703 to receive via communication interface 701 a Diameter message having a "Destination-PGW" AVP with an address for a home PGW. Operating software 707 further directs processing system 703 to create a "Destination-Host" AVP and populate the "Destination-Host" AVP with the address for the home PGW. Operating software 707 directs processing system 703 to determine a PCRF that is associated with the home PGW based on the address for the home PGW in the "Destination-Host" AVP and replace the address of the home PGW in the "Destination-Host" AVP with the network address of the PCRF. Operating software 707 further directs processing system 703 to transfer the Diameter message via communication interface 701 to the PCRF.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   receiving, from a wireless communication device, a request to establish a communication session over a communication network, wherein the communication network exchanges messages using a Diameter authentication, authorization, and accounting protocol;
   in response to receiving the request, determining a home packet data network gateway (PGW) for the wireless communication device;

adding an indication of the home PGW to a Diameter message for establishing the communication session;

based on the indication of the home PGW, routing the Diameter message through at least one Diameter routing agent to a policy charging and rules function (PCRF) node associated with the home PGW, wherein the at least one Diameter routing agent determines the PCRF node based on the indication of the home PGW;

determine rules associated with the communication session; and establishing the communication session between the wireless communication device and the home PGW based on the rules.

2. The method of claim 1, wherein adding the indication of the home PGW to the Diameter message comprises:

inserting an identifier for the home PGW into an attribute value pair (AVP) of the Diameter message assigned to identify a destination PGW for the communication session.

3. The method of claim 1, wherein the Diameter message would be routed to establish the communication session through a default PGW but for the indication of the home PGW.

4. The method of claim 3, wherein the home PGW is different than the default PGW.

5. The method of claim 1, wherein the rules are provided to the home PGW over a Gxa interface.

6. The method of claim 1, wherein determining the home PGW for the wireless communication device comprises:

transferring an identifier of the wireless communication device to an authentication, authorization, and accounting (AAA) system; and receiving an identifier of the home PGW from the AAA system.

7. The method of claim 1, wherein the home PGW services the communication session based on quality of service rules associated with the wireless communication device.

8. The method of claim 1, wherein the home PGW provides a static Internet Protocol (IP) address to the wireless communication device for the communication session.

9. The method of claim 1, wherein the indication of the home PGW comprises a network address for the home PGW.

10. A wireless communication system, comprising:

a communication interface configured to receive, from a wireless communication device, a request to establish a communication session over a communication network, wherein the communication network exchanges messages using a Diameter authentication, authorization, and accounting protocol;

a processing system configured to, in response to receiving the request, determine a home packet data network gateway (PGW) for the wireless communication device and add an indication of the home PGW to a Diameter message for establishing the communication session; and the communication interface further configured to, based on the indication of the home PGW, route the Diameter message through at least one Diameter routing agent to a policy charging and rules function (PCRF) node associated with the home PGW, wherein the at least one Diameter routing agent determines the PCRF node based on the indication of the home PGW, wherein the PCRF determines rules associated with the communication session; and the communication interface further configured, to establish the communication session between the wireless communication device and the home PGW based on the rules.

11. The wireless communication system of claim 10, wherein to add the indication of the home PGW to the Diameter message the processing system is configured to:

insert an identifier for the home PGW into an attribute value pair (AVP) of the Diameter message assigned to identify a destination PGW for the communication session.

12. The wireless communication system of claim 10, wherein the Diameter message would be routed to establish the communication session through a default PGW but for the indication of the home PGW.

13. The wireless communication system of claim 12, wherein the home PGW is different than the default PGW.

14. The wireless communication system of claim 10, wherein the rules are provided to the home PGW over a Gxa interface.

15. The wireless communication system of claim 10, wherein to determine the home PGW for the wireless communication device the processing system is configured to:

transfer an identifier of the wireless communication device to an authentication, authorization, and accounting (AAA) system; and receive an identifier of the home PGW from the AAA system.

16. The wireless communication system of claim 10, wherein the home PGW services the communication session based on quality of service rules associated with the wireless communication device.

17. The wireless communication system of claim 10, wherein the home PGW provides a static Internet Protocol (IP) address to the wireless communication device for the communication session.

18. The wireless communication system of claim 10, wherein the indication of the home PGW comprises a network address for the home PGW.

* * * * *